United States Patent [19]

O'Bryan, Jr. et al.

[11] 4,337,446

[45] Jun. 29, 1982

[54] APPARATUS FOR PROCESSING MICROWAVE ELECTRICAL ENERGY

[75] Inventors: Henry M. O'Bryan, Jr., Plainfield; John Thomson, Jr., Wall Township, Monmouth County, both of N.J.

[73] Assignee: Bell Telephone Laboratories, Incorporated, Murray Hill, N.J.

[21] Appl. No.: 160,108

[22] Filed: Jun. 16, 1980

[51] Int. Cl.³ .................. H01P 3/08; C01G 23/00
[52] U.S. Cl. ................................ 333/238; 333/239; 423/598
[58] Field of Search ................ 423/598; 333/204, 238

[56] References Cited

U.S. PATENT DOCUMENTS 3,938,064 2/1976 O'Bryan et al. ................. 106/73.31
4,026,811 5/1977 Readey et al. ...................... 423/598

*Primary Examiner*—Herbert T. Carter
*Attorney, Agent, or Firm*—Walter G. Nilsen

[57] ABSTRACT

A process is described for the preparation of ceramic dielectrics for microwave applications which yield high quality (Q) factors, high dielectric stability and excellent mechanical stability. The procedure is particularly useful where the size of the ceramic dielectric structures is large (average diameter greater than one inch).

8 Claims, 3 Drawing Figures

APPARATUS FOR PROCESSING MICROWAVE ELECTRICAL ENERGY

TECHNICAL FIELD

The invention relates to methods of preparing certain dielectric materials for use in microwave devices and microwave devices using such materials.

BACKGROUND OF THE INVENTION

Dielectric materials are used extensively in a variety of electrical devices. Particularly important is the use of dielectric materials in microwave devices. The requirements for such materials are quite stringent and considerable work has been done in recent years to optimize the dielectric properties of material for application to microwave devices. For the purpose of this application, microwave devices involve devices processing electrical signals in the frequency range above 0.5 GHz; generally up to 200 GHz.

Dielectric materials have a variety of applications in microwave devices. In general, microwave devices using dielectric materials are smaller in size than microwave devices without dielectric materials. Also, such devices with dielectric material exhibit superior device characteristics. For example, microwave filters can be made with superior bandpass characteristics and sharper cutoff characteristics. Larger fractions of microwave frequency allocations are usable for high quality transmissions.

A variety of microwave devices may be made using dielectric material. Typical devices are dielectric resonator filters, microwave strip line circuits and various types of oscillators as well as bandpass filters, etc.

The material requirements for microwave devices are extensive and difficult to meet. First of all, a moderately high dielectric constant is required so as to ensure sufficient interaction between microwave radiation and material. In addition, low loss at the appropriate microwave frequency is highly desirable both to reduce microwave losses and to ensure sharp cutoff characteristics. Low loss or high Q requirements are usually difficult to obtain at microwave frequencies and generally limit the choice of materials useful in microwave devices. Besides moderate dielectric constant and low loss, it is also highly desirable that the material be highly temperature stable (near constant dielectric constant as a function of temperature) so that the microwave properties of the devices are not affected by temperature. In a recently issued patent (U.S. Pat. No. 3,938,064 issued to H. M. O'Bryan, Jr. et al on Feb. 10, 1976) a dielectric material is described which exhibits modest dielectric constant suitable for microwave devices together with high Q and low temperature variation of dielectric constant. Such a material has been used extensively in the design of various microwave devices with considerable success.

It is highly desirable to increase the long-term stability of such dielectric material including the dielectric stability (constant dielectric constant and Q) and mechanical stability (freedom from cracks). This is particularly true where large pieces of dielectric material are required in the microwave device as, for example, in the lower part of the microwave frequency range (0.5 to 6 GHz or more, particularly 0.5 to 1.0 GHz). Also, improved Q factor of such dielectric material is highly desirable because this permits greater frequency stability and more desirable device characteristics.

The O'Bryan, Jr. et al reference cited above discloses a procedure for reoxidizing ceramic material in the temperature range from 900 to 1400 degrees C. in oxygen-enriched atmosphere for 10–100 hours.

SUMMARY OF THE INVENTION

The invention is a method for preparing certain dielectric materials for use in microwave devices and microwave devices using such material. The dielectric compound is formed by conventional means and then exposed to a heat treatment in an enriched oxygen atmosphere. The heat treatment is most conveniently carried out after forming the solid ceramic body to be used in the microwave device. The enriched oxygen atmosphere contains at least 50 percent by volume oxygen. The heat treatment is carried out at a temperature between 1100 and 1300 degrees C. for at least six hours, and the ceramic cooled at a rate less than 200 degrees per hour to a temperature below 600 degrees C. Generally, it is preferred to use the slow cooling all the way down to room temperature to avoid thermal shock problems. Essentially pure oxygen atmosphere (greater than 95 percent by volume) is preferred because the effect is more rapid and such an atmosphere is easily provided. Volume may be measured under any reasonable condition so long as all volumes are measured under the same condition. Generally, standard conditions are used (one atmosphere pressure and room temperature). Certain materials are preferred for use in microwave applications. These dielectric materials comprise at least 80 weight percent of ceramic with composition corresponding to at least one of the following nominal formulas: $Ba_2Ti_9O_{20}$, $BaTi_4O_9$ and $ZrTiO_4$. It is preferred that the ceramic composition correspond to just one of the nominal formulas. It is also preferred that the dielectric material consist essentially of at least 99 weight percent of ceramic with composition corresponding to one of the nominal formulas: $Ba_2Ti_9O_{20}$, $BaTi_4O_9$ and $ZrTiO_4$. It is believed that the best microwave properties are obtained when essentially pure (except for small, less than one weight percent additions of Ba for $Ba_2Ti_9O_{20}$ and 10 mole percent tin for $ZrTiO_4$) compounds are used. They are preferred because of their suitable dielectric properties in the microwave region. The material with nominal formula $Ba_2Ti_9O_{20}$ is most preferred because of its unusually low variation of dielectric constant with temperature. It is also found that slight excess of Ba over stoichiometric amounts improves the mechanical stability (particularly resistance to cracking) of $Ba_2Ti_9O_{20}$. Generally, this excess in terms of mole percentage of BaO ranges from 0 to 0.2. Typically, dielectric material prepared according to the invention exhibits moderate dielectric constant and Q factors in excess of 15,000. Further, the temperature coefficient for the dielectric constant is extremely low and the dielectric constant is stable over long periods of time. This results in highly stable microwave characteristics (particularly frequency characteristics) for microwave devices made with this dielectric material. In addition microcracking is essentially absent, even after long periods of time.

DETAILED DESCRIPTION

Figure 1:
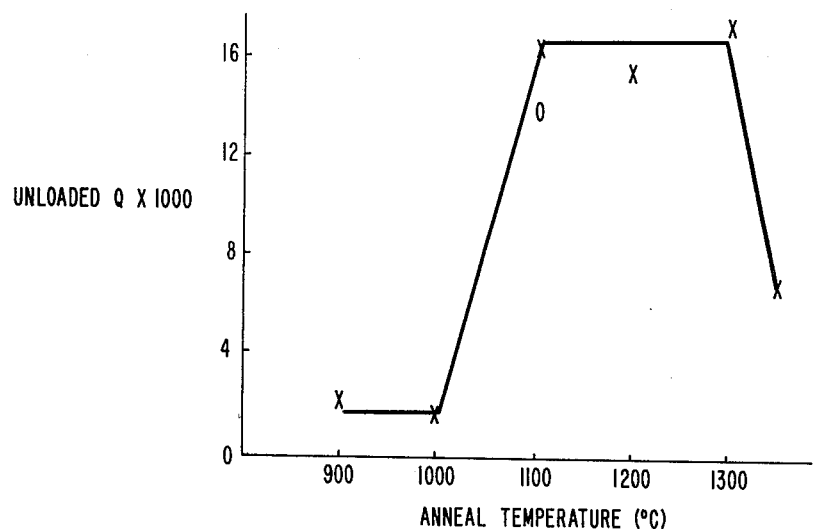
FIG. 1 shows a graph of Q factor versus heat treatment in oxygen at various heat treatment temperatures.

The invention is microwave device comprising certain dielectric material which after formation of the dielectric compound is heat treated in an enriched oxygen atmosphere in the temperature range between 1100 and 1300 degrees C. Heat treatment is carried out in this range for a time period between 6 hours and 24 hours. Close adherence to the temperature range (1100-1300 degrees C.) of the heat treatment is important for maximum increase in the microwave Q of the dielectric material. Heat treatment for less than 6 hours might not complete the effect, and heat treatment over 24 hours is usually wasteful of time. Heat treatment times of approximately 12 hours is preferred because of convenience and the assurance that the effect will be complete. Cooling rates in the enriched atmosphere should be less than 200 degrees per hour. A cooling rate less than approximately 50 degrees per hour is preferred because it yields most consistently ceramic material with maximum Q factors. Preferred dielectric materials are those with nominal formulas of $Ba_2Ti_9O_{20}$, $BaTi_4O_9$ and $ZrTiO_4$. The zirconium titanate is often doped with small amounts of metal ions such as tin. The heat treatment in the enriched oxygen atmosphere is particularly advantageous for ceramic pieces used in the lower part of the microwave region, that is in the region between 0.5 and 6 GHz. Even more preferred is the region between 0.5 and 1.0 GHz where the improvement in microwave properties is quite dramatic. Here, ceramic pieces are usually quite large (average diameters greater than one inch) and heat treatment leads to the largest improvement in mechanical stability and dielectric properties. Generally, this heat treatment is carried out after the formation of the dielectric ceramic and often after final shaping of the ceramic into the size used in the microwave device.

Generally, the dielectric material can be prepared by conventional methods. This will be illustrated for one of the compounds, namely $Ba_2Ti_9O_{20}$. The starting materials may be any reagents that yield BaO an $TiO_2$ under conditions of the preparation. For example, reagent grade $BaCO_3$ and $TiO_2$ are convenient. Measured amounts of starting materials are mixed by conventional means such as ball milling, freeze drying, spray drying, etc. The mixed reagents are dried, screened, and reacted at a temperature between 1000 degrees C. and 1200 degrees C. for 1 to 48 hours in an atmosphere containing oxygen (e.g., air). A reaction temperature of 1125 to 1175 for a time of 2 to 6 hours is preferred since it gives a superior product. X-ray analysis can be used to monitor the decomposition of reagents which yield BaO and $TiO_2$ on decomposition and the formation of the reaction product. Additional mixing of the reacted powder is also beneficial.

One way of carrying out the mixing referred to above is the use of ball milling (see, for example, *Physical Ceramics for Engineers*, by L. H. VanVlack, Addison-Wesley, 1964) in a jar made for example of polyethylene under an organic liquid such as acetone or under water. The balls are made from a variety of materials such as aluminum silicate, zirconium oxide, or alumina. Organic liquids are preferred where cost is not important such as where only limited amounts of dielectric material are being made. Organic liquids do not change the stoichiometry of the reactants since the reactants are not soluble in organic liquids. Water may be preferred where cost is important. Where pure water is used, initial composition may have to be adjusted to account for solubility of components in water. To avoid this problem, the water may be saturated with the reactants (or just reused continuously) prior to use in the ball mill.

Before converting into a dielectric body by sintering or hot pressing, it is preferred to acid leach the reacted starting materials. This procedure improves the Q of the final product and makes the Q more reproducible from batch to batch. Any acid with dissociation constant greater than $10^{-5}$ may be used for leaching but best results are obtained with a strong acid (dissociation constant greater than $10^{-2}$ (e.g., $HNO_3$, HCl, $H_2SO_4$, etc.). The acids $HNO_3$ and HCl are most preferred. For convenience, the acid leach is carried out for between 10 minutes and 6 hours. Time periods of 2-4 hours are preferred. The temperature may vary from the freezing point of the acid to about 50 degrees C. but room temperature is preferred for convenience. Acid leaching above 50 degrees C. is inconvenient and has no substantial advantages over acid leaching below 50 degrees C. Acid concentration may vary from 0.1 M to ordinary concentrated acid (generally 10-18 Molar). Ordinary concentrated acid (10-18 Molar) is preferred for convenience. A typical procedure is to use concentrated $HNO_3$ (14-17 Molar) at an acid to powder ratio of 200 ml/100 gms and to carry out the acid leach for three hours at room temperature. Because this leaching procedure removes material richer in Ba than the desired product, the final product is not the desired composition which corresponds to minimum absolute value of $\tau_{eff}$. Where acid leach is used, the initial composition should be such as to compensate for this Ba loss.

A dielectric body suitable mechanically for making specifically shaped bodies for use in devices is made by either of two methods: hot pressing or sintering. Preferably, these steps should be carried out in an oxygen-enriched atmosphere. These methods involve densification of the ceramic body so that the density of this body approaches the theoretical density exhibited by, for example, single crystals of the dielectric material. In the hot pressing method the ceramic is exposed to high pressures and temperatures to make a densified product. Typical pressures are 1000-6000 psi, the lower pressure limitation to ensure reasonable densification and the upper limitation for convenience since higher pressures do not provide additional benefits and to prevent fracture of the pressure die. Temperature is between 1150 and 1400 degrees C.; the lower limit to ensure densification; the upper limit for convenience since higher temperatures do not provide additional benefits. The minimum time is 30 minutes to ensure complete reaction; the maximum 10 hours since reaction is complete in this time. The density attained is typically 99 percent of the theoretical.

In the sintering operation the dielectric material is first pressed in a steel die at a pressure between 2000-10,000 psi. The sample is then heated to a temperature between 1300 and 1420 degrees C. where it is maintained for 1-24 hours and then cooled. In the above pressure, temperature and time ranges, the lower limit is imposed to ensure proper densification of the body made from the dielectric material. The upper limit is imposed for convenience since no benefits are obtained by exceeding these limits. Rates of heating and cooling higher than 300 degrees C. per hour may have detrimental effects on the product.

In addition, in the case of $Ba_2Ti_9O_{20}$, slight Ba excess in the composition tends to reduce cracking in the final ceramic structure. The excess barium may vary between zero and 0.2 mole percentage of the stoichiometric composition. For example, if the stoichiometric mole percent of Ba is 18.2, then the mole fraction of barium oxide may vary between 18.2 and 18.4.

Usually in the formation of dielectric materials for microwave applications, the solid body is shaped or cut into the desired size and shape. For many applications, the shape is a right cylinder (pillbox). The size (height and width) determine the resonance frequency. Other shapes and sizes may also be useful.

Generally, the heat treatment described above is carried out after the ceramic is put into its final shape. However, the heat treatment may be carried out any time after the dielectric compound (i.e., $Ba_2Ti_9O_{20}$, $BaTi_4O_9$, $ZrTiO_4$, etc.) is formed. This heat treatment often removes discoloration from the dielectric body and noticeably increases the microwave Q factor. The dielectric body is then introduced into the microwave device. Often such microwave devices make use of strip line techniques to introduce microwave signal into the device and to remove such microwave signal from the device.

One class of devices makes use of the dielectric material as a dielectric resonator. The dielectric resonator has dimensions and shape such that for the frequency of the microwave energy of interest the microwave energy is resonant (has high energy storage). The dielectric ceramic is useful in a variety of microwave devices including frequency stabilized microwave sources or channel filters to separate different microwave filters. Other devices act as bandpass filters which allows certain bands of frequencies to propagate through the device while rejecting frequencies outside the bandpass. The characteristics of these microwave devices including bandpass frequencies and shape of the bandpass depend largely on the shape and size of the resonators and on the dielectric characteristics of the dielectric material. Stability of the dielectric characteristics with time is essential so that microwave devices do not change characteristics (bandpass frequency, source frequency, etc.) with use. Dielectric material fabricated in accordance with the invention remains stable (unchanged dielectric characteristics) indefinitely. In addition, such material exhibits unusually low dielectric losses (high Q) in the microwave region. Microwave devices made with such dielectric material have advantageous characteristics such as stable characteristics over long periods of time, low loss, excellent bandpass characteristics, and long device lifetime.

FIG. 1 shows a graph of the effect of annealing temperature on the loss quality of certain dielectric material. The dielectric material is used in the shape of a right cylinder with diameter approximately 2.24 inches and height approximately 1.45 inches. The material is $Ba_2Ti_9O_{20}$ and the frequency approximately 0.868 GHz. The loss factor is measured in terms of unloaded Q. Before heat treatment, sintered ceramic which has been cooled at 50 degrees C. per hour from a sintering temperature of 1375–1400 degrees C. has an unloaded Q of less than 2000. In the experiment, all samples were exposed to an essentially pure oxygen atmosphere (generally greater than 90 volume percent oxygen) for a period of 6, 12, or 24 hours at the temperature indicated. The points indicated by crosses are for heat treatments of 12 or 24 hours, open circles are for 6 hours. The ceramic discs were then cooled at a rate of 50 degrees per hour in the same oxygen atmosphere. As can be seen, unloaded Q improves significantly when the heat treatment temperature is in the range between 1100 and 1300 degrees. Further, it appears beneficial if the rate of cooling remains around approximately 50 degrees per hour. Still, satisfactory results are obtained for cooling rates up to 200 degrees per hour, particularly for smaller sized ceramic pieces. These experiments were carried out on dielectric material with nominal formula $Ba_2Ti_9O_{20}$. The restricted cooling rate is used down to 600 degrees C. below which cooling rate no longer has an effect.

Other experiments were carried out at higher microwave frequencies where the size of the dielectric ceramic pieces is smaller. The resonator is in the shape of a right cylinder with diameter approximately 0.6 inches and height approximately 0.2 inches. These dimensions yield a resonance frequency of approximately 4 GHz. Table I shows the improvement in microwave losses (in terms of unloaded Q) after heat treatment in an oxygen enriched atmosphere (generally greater than 90 weight percent oxygen) at 1100 degrees C. for 6 hours and cooling in the same atmosphere at a rate of 200 degrees C. per hour.

TABLE I

| Heat Treatment of Small Resonators | |
|---|---|
| Q (before Treatment) | Q (after Treatment) |
| $BaTi_4O_9$ 7500 | 8130 |
| $ZrTiO_4(Sn)$ 6250 | 7730 |
| $Ba_2Ti_9O_{20}$ 8500 | 9300 |

Even for small ceramic pieces, dielectric properties are improved, and these improvements are significant in the design of microwave devices. The tin in the $ZrTiO_4$ is added as a sintering agent in the amount of about 10 mole percent.

Figure 2:
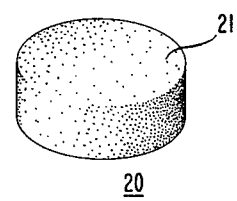
FIG. 2 shows a perspective view of a typical ceramic shape useful in microwave devices.

FIG. 2 shows a perspective view of a typical ceramic piece 20 in the shape of a right cylinder (or pillbox) 21 made in accordance with the invention. Various shapes are useful in the design of microwave devices incorporating dielectric material. The right cylinder is usually preferred because of ease of making such shapes with high accuracy.

Figure 3:
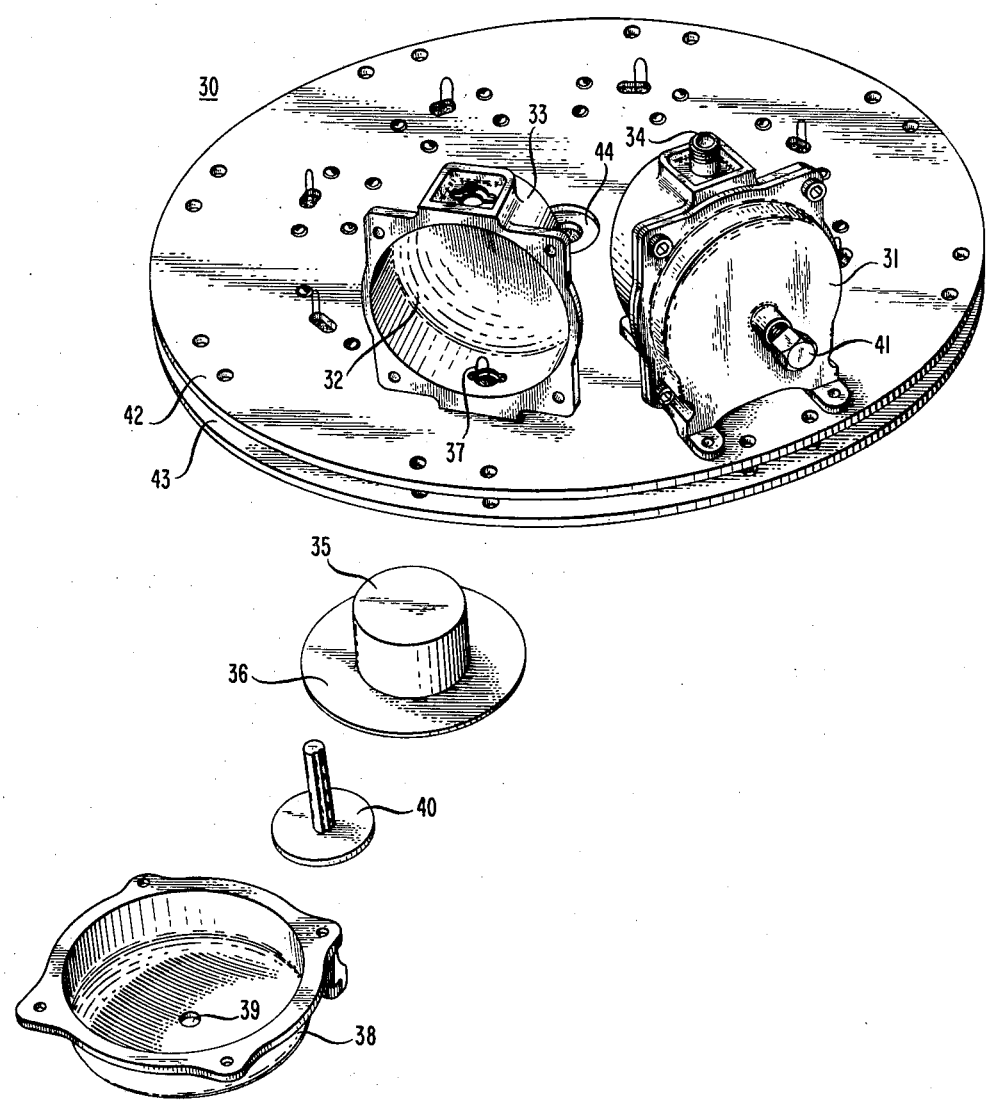
FIG. 3 shows a particular microwave device (a signal source) where ceramic is used as a frequency stabilizer.

FIG. 3 shows a perspective view of a partly assembled dielectric resonator combiner 30 with several channels operating at different frequencies. Channel frequency control units 31 are composed of a cylindrical resonator 32 centered in a cylindrical aluminum housing 33. Microwave energy is admitted into the cylindrical resonator through a coax connector and coupling loop (not visible in this drawing). The cylindrical resonator 32 contains a dielectric ceramic 35 (i.e., $Ba_2Ti_9O_{20}$) made in accordance with the invention. The dielectric ceramic is in the form of a right cylinder or pillbox with resonant frequency near that required by the cylindrical resonator. The dielectric ceramic piece 35 is attached to a round alumina slab 36 and this structure placed in the cylindrical resonator so that the pillbox faces inward. Microwave energy is coupled out of the cylindrical resonator by means of a coupling loop 37. A cover 38 encloses the cylindrical resonator 32 and serves of the mount (through a hole 39 in the cover 38) for the tuning plunger 40 used to trim the resonant frequency of the structure. The tuning screw 41 for the tuning plunger 40 is shown on the assembled channel frequency control unit 31. The units are mounted on a mounting plate 42 which is separated from a base plate 43 so as to provide room for a strip line combining board to combine signals from the various cylindrical resonators. These signals are coupled out of the cylindrical resonators by means of coupling units. The combined signal exits the dielectric resonator combiner 30 by means of a connector mounted in a hole 44 in the center of the mounting plate 42 and base plate.

What is claimed is:

1. An apparatus for processing microwave electrical energy with frequency between 0.5 and 6.0 GHz comprising a dielectric material for interaction with the microwave electrical energy, means for introducing microwave electrical energy into the dielectric material, conducting member to contain the microwave electrical energy in the apparatus in which the dielectrical material comprises at least 80 weight percent ceramic with composition corresponding to nominal formula of $Ba_2Ti_9O_{20}$ characterized in that after sintering into a solid ceramic body the dielectric material is exposed to a heat treatment comprising the steps of (a) contacting the dielectric material to an oxygen enriched atmosphere consisting of at least 50 volume percent oxygen for at least 6 hours at a temperature between 1100 and 1300 degrees C.; and (b) cooling the dielectric material in the oxygen enriched atmosphere at a rate less than 200 degrees per hour down to 600 degrees C.

2. The apparatus of claim 1 in which the atmosphere consists of at least 95 volume percent oxygen.

3. The apparatus of claim 1 in which the heat treatment is from 6 to 24 hours.

4. The apparatus of claim 3 in which the heat treatment is approximately 12 hours.

5. The apparatus of claim 1 in which the cooling rate is less than approximately 50 degrees C. per hour down to 600 degrees C.

6. The apparatus of claim 1 in which the microwave electrical energy has a frequency between 0.5 and 1.0 GHz.

7. The apparatus of claim 1 in which there is excess barium over the stoichiometric amount of between zero and 0.2 mole percent.

8. The apparatus of claim 1 in which the dielectric material is in the form of a right cylinder which is used to stabilize microwave frequency in the frequency range from 0.5 to 1.0 GHz.

* * * * *